(12) United States Patent
Bodtker et al.

(10) Patent No.: US 10,144,383 B2
(45) Date of Patent: Dec. 4, 2018

(54) STEERING WHEEL WITH VIDEO SCREEN AND AIRBAG

(71) Applicant: STEERING SOLUTIONS IP HOLDING CORPORATION, Saginaw, MI (US)

(72) Inventors: Joen C. Bodtker, Gaines, MI (US); John F. Schulz, Hemlock, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 15/279,487

(22) Filed: Sep. 29, 2016

(65) Prior Publication Data

US 2018/0086297 A1     Mar. 29, 2018

(51) Int. Cl.
| | |
|---|---|
| *B60R 21/203* | (2006.01) |
| *B60R 21/2165* | (2011.01) |
| *B62D 1/10* | (2006.01) |
| *B60K 35/00* | (2006.01) |
| *H04N 9/12* | (2006.01) |
| *B60R 21/215* | (2011.01) |
| *B62D 1/04* | (2006.01) |

(52) U.S. Cl.
CPC ............ *B60R 21/203* (2013.01); *B60K 35/00* (2013.01); *B60R 21/21656* (2013.01); *B62D 1/10* (2013.01); *H04N 9/12* (2013.01); *B60K 2350/2004* (2013.01); *B60K 2350/407* (2013.01); *B60R 2021/21512* (2013.01); *B62D 1/046* (2013.01)

(58) Field of Classification Search
CPC ...................................................... B60R 11/02
See application file for complete search history.

(56) References Cited

U.S. PATENT DOCUMENTS

| | | |
|---|---|---|
| 3,011,802 A | 12/1961 | Ackerman |
| 3,643,606 A | 2/1972 | Vise |
| 3,937,101 A | 2/1976 | Wade |
| 4,287,621 A | 9/1981 | Kertz |
| 4,337,967 A | 7/1982 | Yoshida et al. |
| 4,453,788 A | 6/1984 | Russell |
| 4,503,504 A | 3/1985 | Suzumura et al. |
| 4,967,618 A | 11/1990 | Matsumoto et al. |

(Continued)

FOREIGN PATENT DOCUMENTS

| | | |
|---|---|---|
| CN | 2483289 Y | 3/2002 |
| CN | 2527486 Y | 12/2002 |

(Continued)

OTHER PUBLICATIONS

Chinese Office Action and Search Report dated Nov. 24, 2017 for Chinese Application No. 201610287651.2, English Translation, 10 pages.

(Continued)

*Primary Examiner* — Nicole T Verley
(74) *Attorney, Agent, or Firm* — Cantor Colburn LLP

(57) ABSTRACT

A steering assembly includes a steering wheel and display interface. The steering wheel has an airbag module disposed within a hub of the steering wheel. The display interface is disposed on the steering wheel over the airbag module. The display interface has a first display segment disposed adjacent to a second display segment.

13 Claims, 5 Drawing Sheets

(56) References Cited

U.S. PATENT DOCUMENTS

| | | |
|---|---|---|
| 5,060,581 A | 10/1991 | Malinski |
| 5,178,411 A | 1/1993 | Fevre et al. |
| 5,181,759 A | 1/1993 | Doolittle |
| 5,193,777 A | 3/1993 | Faulstich |
| 5,295,712 A | 3/1994 | Omura |
| 5,319,803 A | 6/1994 | Allen |
| 5,487,521 A | 1/1996 | Callahan |
| 5,542,314 A | 8/1996 | Sullivan et al. |
| 5,555,502 A | 9/1996 | Opel |
| 5,618,058 A | 4/1997 | Byon |
| 5,662,047 A | 9/1997 | Metcalf |
| 5,690,362 A | 11/1997 | Peitsmeier et al. |
| 5,691,695 A | 11/1997 | Lahiff |
| 5,821,935 A | 10/1998 | Hartman et al. |
| 5,893,580 A | 4/1999 | Hoagland et al. |
| 5,911,789 A | 6/1999 | Keipert et al. |
| 6,170,862 B1 | 1/2001 | Hoagland et al. |
| 6,174,097 B1 | 1/2001 | Daniel |
| 6,227,425 B1 | 5/2001 | Ware, Sr. |
| 6,227,571 B1 | 5/2001 | Sheng et al. |
| 6,249,744 B1 | 6/2001 | Morita |
| 6,305,217 B1 | 10/2001 | Mansfeld et al. |
| 6,360,149 B1 | 3/2002 | Kwon et al. |
| 6,373,472 B1 | 4/2002 | Palalau et al. |
| 6,390,505 B1 | 5/2002 | Wilson |
| 6,532,152 B1 | 3/2003 | White et al. |
| 6,669,233 B2 | 12/2003 | Gabriel |
| 6,760,569 B1 | 7/2004 | Chen |
| 6,819,990 B2 | 11/2004 | Ichinose |
| 7,048,305 B2 | 5/2006 | Muller |
| 7,062,365 B1 | 6/2006 | Fei |
| 7,126,583 B1* | 10/2006 | Breed ............... B60K 35/00 345/158 |
| 7,236,355 B2 | 6/2007 | Kim |
| D547,244 S | 7/2007 | Munger |
| 7,295,904 B2 | 11/2007 | Kanevsky et al. |
| 7,315,291 B2 | 1/2008 | Yoshihara et al. |
| 7,461,863 B2 | 12/2008 | Muller |
| 7,474,204 B2 | 1/2009 | Songwe |
| 7,611,198 B2 | 11/2009 | Schweizer |
| 7,735,405 B2 | 6/2010 | Parks |
| 7,775,584 B2 | 8/2010 | Hughes et al. |
| 7,793,980 B2 | 9/2010 | Fong |
| 7,862,079 B2 | 1/2011 | Fukawatase et al. |
| 7,894,951 B2 | 2/2011 | Norris et al. |
| 8,002,075 B2 | 8/2011 | Markfort |
| 8,079,312 B2 | 12/2011 | Long |
| 8,146,945 B2 | 4/2012 | Born et al. |
| 8,260,482 B1 | 9/2012 | Szybalski et al. |
| 8,352,110 B1 | 1/2013 | Szybalski et al. |
| 8,474,860 B2* | 7/2013 | Ohoka ............... B60R 11/0235 280/728.3 |
| 8,538,628 B2* | 9/2013 | Backman ............ B60K 37/06 701/36 |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,662,364 B2 | 3/2014 | Vuillet |
| 8,670,891 B1 | 3/2014 | Szybalski et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,899,623 B2 | 12/2014 | Stadler et al. |
| 8,909,428 B1 | 12/2014 | Lombrozo |
| 8,948,993 B2 | 2/2015 | Schulman et al. |
| 8,994,521 B2 | 3/2015 | Gazit |
| 9,002,563 B2 | 4/2015 | Green et al. |
| 9,031,729 B2 | 5/2015 | Lathrop et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,096,130 B2* | 8/2015 | Pechnyk ............... B60R 21/215 |
| 9,132,787 B2 | 9/2015 | Cooper |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2* | 11/2015 | Schramm ............ B60K 35/00 |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,442,289 B2 | 9/2016 | Nishima et al. |
| 9,552,148 B2* | 1/2017 | Kim .................. B62D 1/046 |
| 9,821,726 B2 | 11/2017 | Nash et al. |
| 9,834,121 B2 | 12/2017 | Riefe |
| 2002/0073899 A1 | 6/2002 | Chen |
| 2003/0227159 A1 | 12/2003 | Muller |
| 2004/0011835 A1 | 1/2004 | Kim |
| 2005/0076815 A1 | 4/2005 | Twyford |
| 2006/0146074 A1* | 7/2006 | Harrison ............ B60K 35/00 345/660 |
| 2006/0244251 A1 | 11/2006 | Muller |
| 2006/0286944 A1 | 12/2006 | Songwe |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0099465 A1 | 5/2007 | Ruetz |
| 2007/0205875 A1 | 9/2007 | De Haan |
| 2007/0241548 A1 | 10/2007 | Fong |
| 2008/0249668 A1 | 10/2008 | Miyata et al. |
| 2009/0027234 A1 | 1/2009 | Lee |
| 2009/0084291 A1 | 4/2009 | Long |
| 2009/0229485 A1 | 9/2009 | Parks |
| 2010/0184406 A1 | 7/2010 | Schrader |
| 2010/0222976 A1 | 9/2010 | Haug |
| 2010/0228417 A1 | 9/2010 | Lee et al. |
| 2010/0253652 A1 | 10/2010 | Homma et al. |
| 2010/0288567 A1 | 11/2010 | Bonne |
| 2011/0101058 A1 | 5/2011 | Heckman |
| 2011/0305494 A1 | 12/2011 | Kang |
| 2012/0028682 A1 | 2/2012 | Danne |
| 2012/0074674 A1* | 3/2012 | Ohoka ............... B60R 11/0235 280/728.3 |
| 2012/0136540 A1 | 5/2012 | Miller |
| 2012/0223200 A1 | 9/2012 | Cooper |
| 2012/0271500 A1 | 10/2012 | Tsimhoni et al. |
| 2012/0287050 A1 | 11/2012 | Wu |
| 2013/0002416 A1 | 1/2013 | Gazit |
| 2013/0292955 A1 | 11/2013 | Higgins et al. |
| 2013/0325202 A1 | 12/2013 | Howard et al. |
| 2014/0062891 A1 | 3/2014 | Powell |
| 2014/0111324 A1 | 4/2014 | Lisseman et al. |
| 2014/0131403 A1 | 5/2014 | Wright |
| 2014/0195096 A1 | 7/2014 | Schliep et al. |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2014/0311880 A1 | 10/2014 | Krumpelman et al. |
| 2015/0002404 A1 | 1/2015 | Hooton |
| 2015/0032322 A1 | 1/2015 | Wimmer et al. |
| 2015/0051780 A1 | 2/2015 | Hahne |
| 2015/0120142 A1 | 4/2015 | Park et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283926 A1 | 10/2015 | Hamdoon et al. |

(56) References Cited

U.S. PATENT DOCUMENTS

| | | |
|---|---|---|
| 2015/0283998 A1 | 10/2015 | Lind et al. |
| 2015/0324111 A1 | 11/2015 | Jubner et al. |
| 2016/0001781 A1 | 1/2016 | Fung et al. |
| 2016/0001807 A1* | 1/2016 | Hans .................. B62D 1/046 345/173 |
| 2016/0039457 A1 | 2/2016 | Klank et al. |
| 2016/0071662 A1 | 3/2016 | Cai |
| 2016/0082867 A1 | 3/2016 | Sugioka et al. |
| 2016/0114770 A1 | 4/2016 | Lombrozo |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0304123 A1 | 10/2016 | Lewis et al. |
| 2016/0325662 A1 | 11/2016 | Nash et al. |
| 2016/0347347 A1 | 12/2016 | Lubischer et al. |
| 2016/0368522 A1 | 12/2016 | Lubischer et al. |
| 2016/0375924 A1 | 12/2016 | Bodtker et al. |
| 2016/0375926 A1 | 12/2016 | Lubischer et al. |
| 2016/0375927 A1 | 12/2016 | Schulz et al. |
| 2016/0375931 A1 | 12/2016 | Lubischer et al. |
| 2017/0029018 A1 | 2/2017 | Lubischer et al. |
| 2017/0113589 A1 | 4/2017 | Riefe |

FOREIGN PATENT DOCUMENTS

| | | | | |
|---|---|---|---|---|
| CN | 101855121 | A | 10/2010 | |
| CN | 201694075 | U | 1/2011 | |
| CN | 102910199 | A | 2/2013 | |
| CN | 103448785 | A | 12/2013 | |
| CN | 204037399 | U | 12/2014 | |
| CN | 104512458 | A | 4/2015 | |
| CN | 104684792 | A | 6/2015 | |
| DE | 2025003 | A | 12/1971 | |
| DE | 20014731 | U1 | 1/2002 | |
| DE | 102005053176 | A1 * | 5/2007 | ............ B60K 35/00 |
| DE | 202005020169 | U1 | 7/2007 | |
| DE | 102010050699 | A1 * | 8/2011 | ............ B60K 35/00 |
| DE | 102016001257 | * | 9/2016 | |
| EP | 0992395 | A2 | 4/2000 | |
| EP | 2746134 | A1 | 6/2014 | |
| FR | 2779695 | A1 | 12/1999 | |
| FR | 2983134 | A1 | 5/2013 | |
| JP | S60157963 | A | 8/1985 | |
| JP | 61142673 | U | 9/1986 | |
| JP | S63305055 | A | 12/1988 | |
| JP | H11314542 | A | 11/1999 | |
| JP | 2002225724 | A | 8/2002 | |
| JP | 2007253809 | A | 10/2007 | |
| JP | 2013025620 | A | 2/2013 | |
| KR | 20070069100 | A | 7/2007 | |
| WO | 2007021263 | A1 | 2/2007 | |
| WO | 2014166685 | A1 | 10/2014 | |

OTHER PUBLICATIONS

English translation of Chinese Office Action and Search Report for Chinese Application No. 201610366609.X dated Dec. 20, 2017, 16 pages.

English Translation of Chinese Office Action and Search Report for Chinese Application No. 201610491464.6 dated Jan. 19, 2018, 8 pages.

English Translation of Chinese Office Action and Search Report for Chinese Application No. 201610830167.X dated Feb. 24, 2018, 11 pages.

English Translation of Chinese Office Action and Search Report for Chinese Application No. 201610830169.9 dated Feb. 26, 2018, 12 pages.

English Translation of Chinese Office Action and Search Report for Chinese Application No. 201611114139.4 dated May 4, 2018, 11 pages.

* cited by examiner

STEERING WHEEL WITH VIDEO SCREEN AND AIRBAG

BACKGROUND OF THE INVENTION

Vehicle steering wheels may be used by a driver of the vehicle to provide directional control of the vehicle. Autonomous vehicles are provided with advanced sensors, electronics, and controllers to provide directional control of the vehicle without driver intervention. An operator of the autonomous vehicle may be able to perform non-driving activities while the autonomous vehicle is controlled by the advanced sensors, electronics, or controllers.

SUMMARY OF THE INVENTION

According to an embodiment of the present disclosure, a steering assembly is provided. The steering assembly includes a steering wheel and a display interface. The steering wheel is selectively coupled to a steering shaft. The steering wheel has a hub and an airbag cover disposed on the hub. The hub is configured to receive an airbag module. The display interface is disposed within the airbag cover that is disposed over the airbag module. The display interface is configured to split in response to expansion of an airbag of the airbag module.

According to another embodiment of the present disclosure, a steering assembly for an autonomous vehicle is provided. The steering assembly includes a steering wheel and display interface. The steering wheel has an airbag module disposed within a hub of the steering wheel. The display interface is disposed on the steering wheel over the airbag module. The display interface has a first display segment disposed adjacent to a second display segment.

According to yet another embodiment of the present disclosure, a steering assembly is provided. The steering assembly includes a steering wheel and a display interface. The steering wheel has a hub that receives an airbag module and an air bag cover disposed over the airbag module. The display interface is disposed on the airbag cover.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
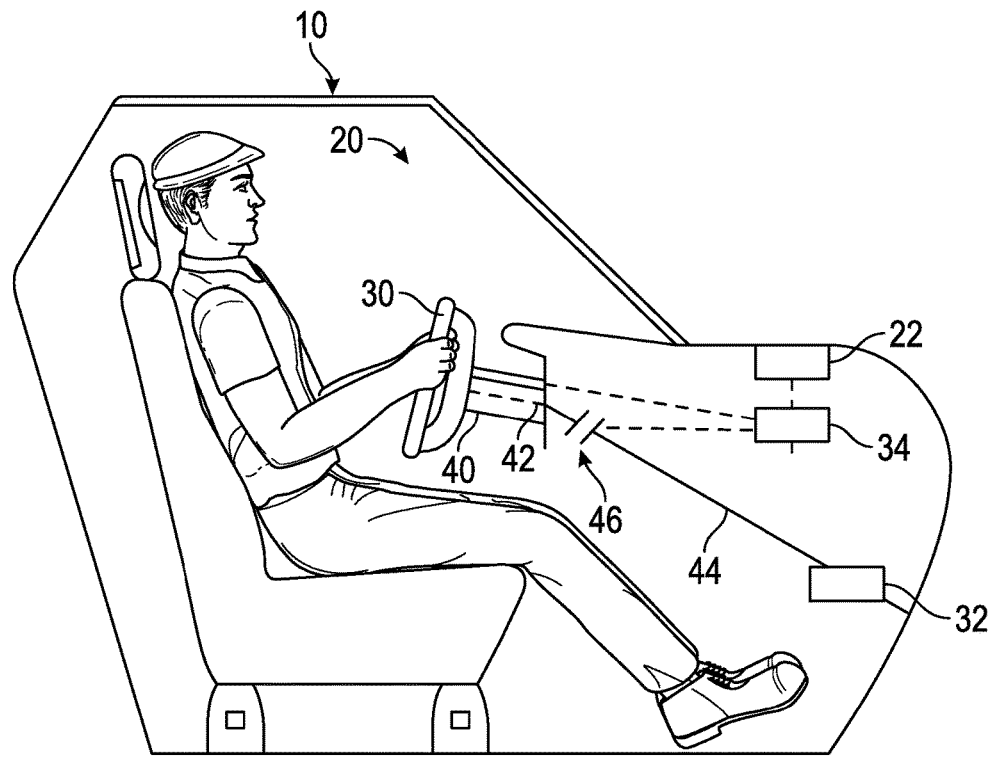
FIG. 1 is a side view of a vehicle compartment having a steering assembly in an extended position.
Figure 2:
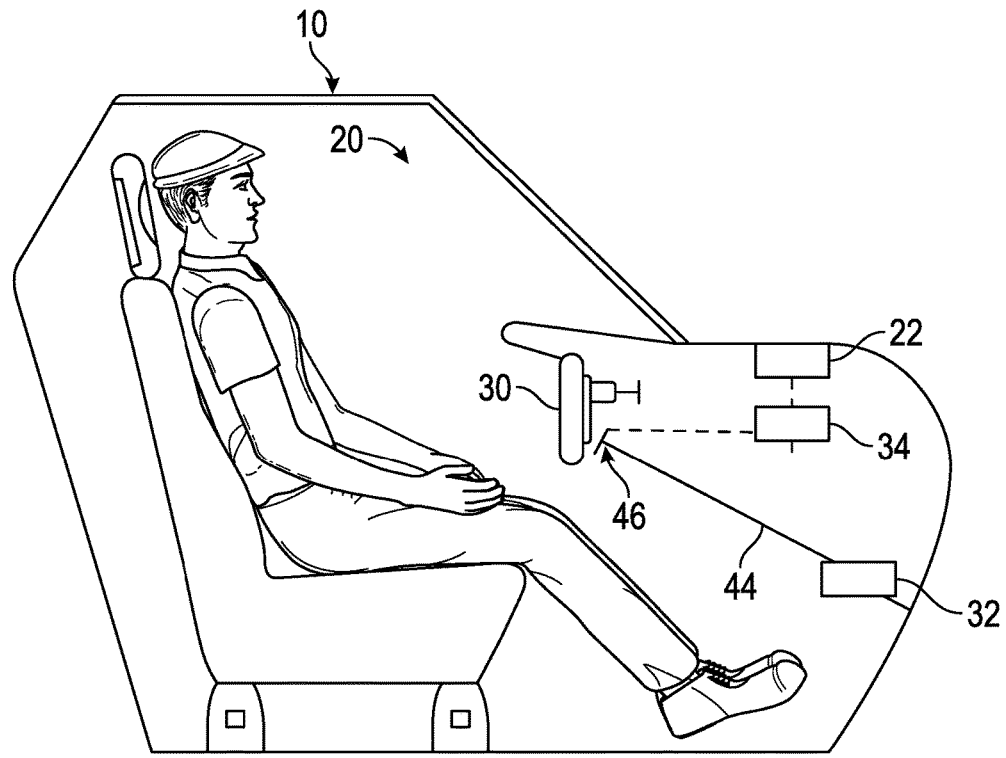
FIG. 2 is a side view of the vehicle compartment having the steering assembly in a retracted position.

Referring to FIGS. 1 and 2, a side view of a space within a vehicle, an autonomous vehicle, an autonomously driven vehicle, or a selectively autonomous vehicle such as a vehicle compartment 10 is shown. The vehicle is provided with a steering assembly 20 and an autonomous driving assisted steering system or advanced driver assist system (ADAS) 22 such that the vehicle is able to perform operations without continuous input from a driver (e.g. steering, accelerating, braking, maneuvering, etc.). The ADAS 22 allows the vehicle to be at least partially autonomously controlled using sensing, steering, and/or braking technology. A driver of the vehicle is able to selectively activate or deactivate the ADAS 22 via a switch or other mechanism. A vehicle control or monitoring system is able to selectively activate or deactivate the ADAS 22 in response to events occurring within or external to the vehicle.

The steering assembly 20 includes a steering wheel 30, a steering gear 32, and a controller 34. The steering wheel 30 is operatively connected to a steering column 40. The combination of the steering wheel 30 and the steering column 40 are movable between an extended position (see FIG. 1) and a retracted (see FIG. 2) along a longitudinal axis 42 that extends through the steering column 40. The extended position corresponds to a position in which a driver of the vehicle is able to provide steering input via the steering wheel 30. The retracted position corresponds to a position in which the driver of the vehicle is not required to provide steering input via the steering wheel 30.

The steering wheel 30 may be directly or indirectly selectively coupled to a steering shaft 44 that is operatively connected to the steering gear 32. The steering wheel 30 is directly or indirectly selectively coupled to the steering shaft 44 by a coupling mechanism 46. The coupling mechanism 46 may include a disconnect clutch. The steering wheel 30 is coupled to the steering shaft 44 when the disconnect clutch of the coupling mechanism 46 is at least partially engaged and the ADAS 22 is deactivated. The steering wheel 30 is decoupled from the steering shaft 44 when the disconnect clutch of the coupling mechanism 46 is disengaged and the ADAS 22 is activated.

The steering wheel 30 is switchable between a rotatable condition and a non-rotating condition in response to the selective activation of the ADAS 22. The driver of the vehicle is able to provide directional control of the vehicle through the steering wheel 30 when the ADAS 22 is deactivated and the steering wheel 30 is in the rotatable condition. The steering wheel 30 is in a rotatable condition when the ADAS 22 is deactivated and the steering wheel 30 is in the extended position.

The steering wheel 30 is switched from a rotatable condition to a non-rotating condition when the ADAS 22 is activated. The steering wheel 30 may be inhibited from rotating in the non-rotating condition. The steering wheel 30 is in the non-rotating condition when the steering wheel 30 is operatively decoupled from the steering shaft 44 and/or in the retracted position. In at least one embodiment, when the ADAS 22 is activated, the steering shaft 44 counter rotates such that no rotation of the steering wheel 30 is caused by the performance of steering maneuvers controlled by the ADAS 22. It is to be appreciated that "decoupling" the steering wheel 30 from the steering shaft 44 may be done mechanically, electrically, or a combination thereof.

Figure 3:
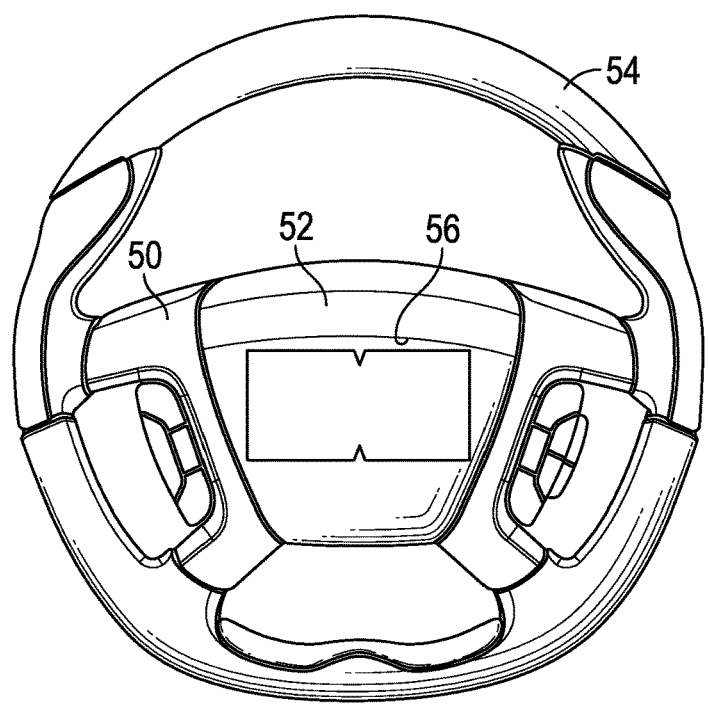
FIG. 3 is a perspective view of a steering wheel having a display interface.

The steering wheel 30 is in communication with the ADAS 22 and the controller 34. Referring to FIG. 3, the steering wheel 30 includes a hub 50, an airbag cover 52, a rim 54, and a display interface 56. The hub 50 operatively connects the steering wheel 30 to the steering column 40. The hub 50 defines a cavity or a receptacle that is configured to receive an airbag module 60 having an airbag 62. The airbag module 60 includes an inflator that is configured to deploy the airbag 62 such that the inflator fills the airbag 62 with a pressurized gas to expand the airbag 62 to protect a driver of the vehicle during certain vehicle impact events.

The airbag cover 52 is disposed on the hub 50. The airbag cover 52 is commonly referred to as a horn pad due to its operable communication with a vehicle horn. The airbag cover 52 is configured to cover the cavity or a receptacle defined by the hub at 50 to protect and cover the airbag module 60.

The rim 54 is operatively connected to the hub 50. The rim 54 extends at least partially about the hub 50.

The display interface 56 is installed on or within at least one of the hub 50 and the airbag cover 52. In at least one embodiment, the display interface 56 is electronically joined to the airbag cover 52. The display interface 56 is configured as a display unit, a video screen, computer monitor, a vehicle information display, a graphical user interface, or the like. The display interface 56 includes a display area 70 having a viewing area 72 that is configured to display information such as vehicle gauges, a virtual map, a GPS map, applications for work and/or entertainment, or the like. The viewing area 72 may approximate an airbag footprint. In at least one embodiment, the viewing area 72 is completely disposed within the display area 70. In other embodiments, the viewing area 72 and the display area 70 are substantially the same size such that the terms viewing area and display area may be used interchangeably.

The display interface 56 may be constructed of a thin, frangible, or flexible material such as polyimide, polyethernaphthalate, or the like. The display interface 56 is configured as a frangible display interface to facilitate or enable the airbag 62 of the airbag module 60 to be deployed with minimal or no restrictions during a vehicle impact event. The display interface 56 may be configured to split, detach, or hingedly/pivotally move out of the deployment path of the airbag 62 of the airbag module 60.

Figure 4:
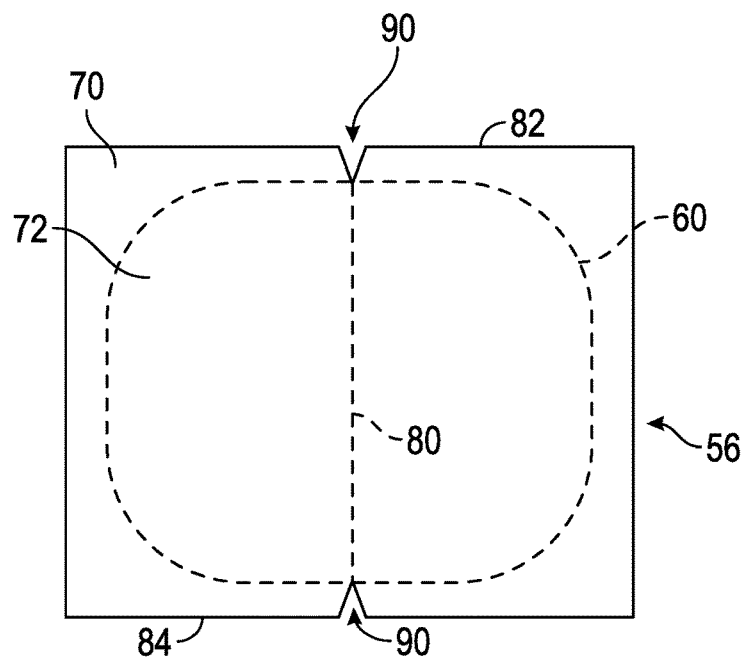
FIG. 4 is an elevation view of a display interface of a first embodiment of the steering wheel.
Figure 5:
FIG. 5 is a top section view of the display interface of the first embodiment of the steering wheel prior to expansion of an airbag.

Referring to FIGS. 4 and 5, a first embodiment of the display interface 56 of the steering wheel 30 is shown. The display interface 56 is configured to split in response to expansion of the airbag 62 of the airbag module 60. As used in the present disclosure, the term "split" is interpreted to mean that the display interface 56 cleanly bifurcates with minimal discernible discharge.

The display interface 56 may tear, crack, or fracture along a predicted tear path 80 that extends from a first side 82 of the display interface 56 towards a second side 84 of the display interface 56. In at least one embodiment, the predicated tear path 80 may be a predefined split that is formed or defined in the display interface 56. The predicted tear path 80 extends through the display area 70 of the display interface 56. The second side 84 is disposed opposite the first side 82. The display interface 56 is configured to flex and subsequently split along the predicted tear path 80 in response to expansion of the airbag 62 of the airbag module 60.

The display interface 56 defines a tear initiator 90. The tear initiator 90 extends from at least one of the first side 82 and the second side 84 towards the viewing area 72 but does not extend into the viewing area 72. The tear initiator 90 is spaced apart from the viewing area 72. In at least one embodiment, a tear initiator 90 extends from the first side 82 of the display interface 56 towards the viewing area 72 and another tear initiator 90 extends from the second side 84 towards the viewing area 72. The tear initiator 90 functions as a stress riser that encourages or causes a tear or split to form within the display interface 56 that extends from an edge to an opposite edge or extends from a side to an opposite side. Referring to FIG. 5, the tear or split extends from at least one of the first side 82 and the second side 84 towards the opposite of at least one of the first side 82 and the second side 84 in response to the at least partial inflation or expansion of the airbag 62 of the airbag module 60 disposed within the steering wheel 30.

The tear initiator 90 is configured as a notch or the like. The tear initiator 90 is sized based on the material selected for the display interface 56, the thickness of the display interface 56, the rigidity of the display interface 56, and the deployment force of the airbag 62 of the airbag module 60.

Figure 6:
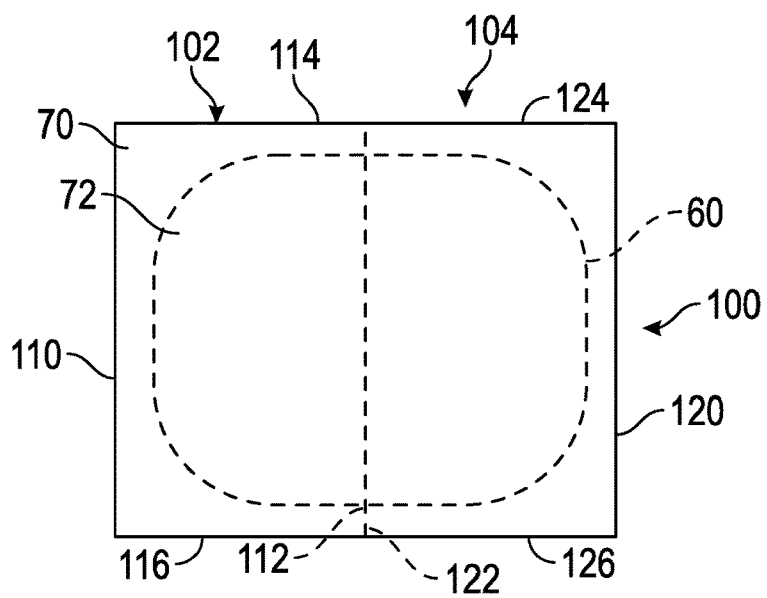
FIG. 6 is an elevation view of a display interface of a second embodiment of a steering wheel.
Figure 7:
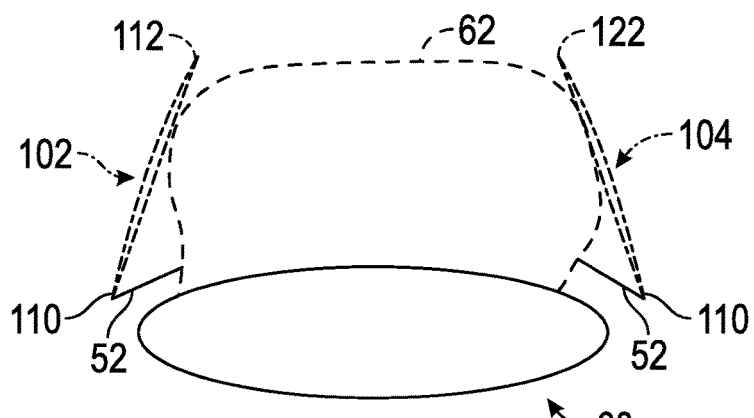
FIG. 7 is a top section view of the display interface of the second embodiment of the steering wheel during expansion of an airbag.

Referring to FIGS. 6 and 7, a second embodiment of a display interface 100 of the steering wheel 30 is shown. The display interface 100 is disposed on or within the steering wheel 30 over the airbag module 60. The display interface 100 includes a first display segment 102 and a second display segment 104 that is disposed adjacent to the first display segment 102. The first display segment 102 and the second display segment 104 are electronically connected to each other such that they define the display area 70 and the viewing area 72 approximate the air bag footprint.

The first display segment 102 includes a first display segment first side 110, a first display segment second side 112, a first display segment third side 114, and a first display segment fourth side 116. The first display segment second side 112 is disposed opposite the first display segment first side 110. The first display segment second side 112 is disposed substantially parallel to the first display segment first side 110. The first display segment third side 114 extends between a first end of each of the first display segment first side 110 and the first display segment second side 112. The first display segment fourth side 116 extends between a second end of each side of the first display segment first side 110 and the first display segment second side 112. The first display segment fourth side 116 is disposed opposite the first display segment third side 114.

The first display segment first side 110 of the first display segment 102 is hingedly connected to the hub 50 or the airbag cover 52 of the steering wheel 30. The first display segment first side 110 may be hingedly connected to at least one of the hub 50 and airbag cover 52 by a rigid or kinematic hinge or a living hinge.

The second display segment 104 includes a second display segment first side 120, a second display segment second side 122, a second display segment third side 124, and a second display segment fourth side 126. The second display segment second side 122 is disposed opposite the second display segment first side 120. The second display segment second side 122 is disposed substantially parallel to the second display segment first side 120. The second display segment third side 124 extends between a first end of each of the second display segment first side 120 and the second display segment second side 122. The second display segment fourth side 126 extends between a second end of each side of the second display segment first side 120 and the second display segment second side 122. The second display segment fourth side 126 is disposed opposite the second display segment third side 124.

The second display segment first side 120 of the second display segment 104 is hingedly connected to the hub 50 or the airbag cover 52 of the steering wheel 30. The second display segment first side 120 may be hingedly connected to at least one of the hub 50 and airbag cover 52 by a rigid or kinematic hinge or a living hinge.

The first display segment second side 112 abuts the second display segment second side 122 when each of the first display segment 102 and the second display segment 104 are in a closed position. The abutment between the first display segment second side 112 and the second display segment second side 122 defines a butt joint or a split 130. The first display segment second side 112 is spaced apart from the second display segment second side 122 when at least one of the first display segment 102 and the second display segment 104 are moving towards an open position.

Referring to FIG. 7, the at least partial inflation or expansion of the airbag 62 of the airbag module 60 disposed within the steering wheel 30 moves at least one of the first display segment 102 and the second display segment 104 of the display interface 100 from the closed position towards the open position. In response to the at least partial expansion of the airbag 62 of the airbag module 60 disposed within the steering wheel 30 at least one of the first display segment 102 and the second display segment 104 hingedly move from the closed position towards the open position.

Figure 8:
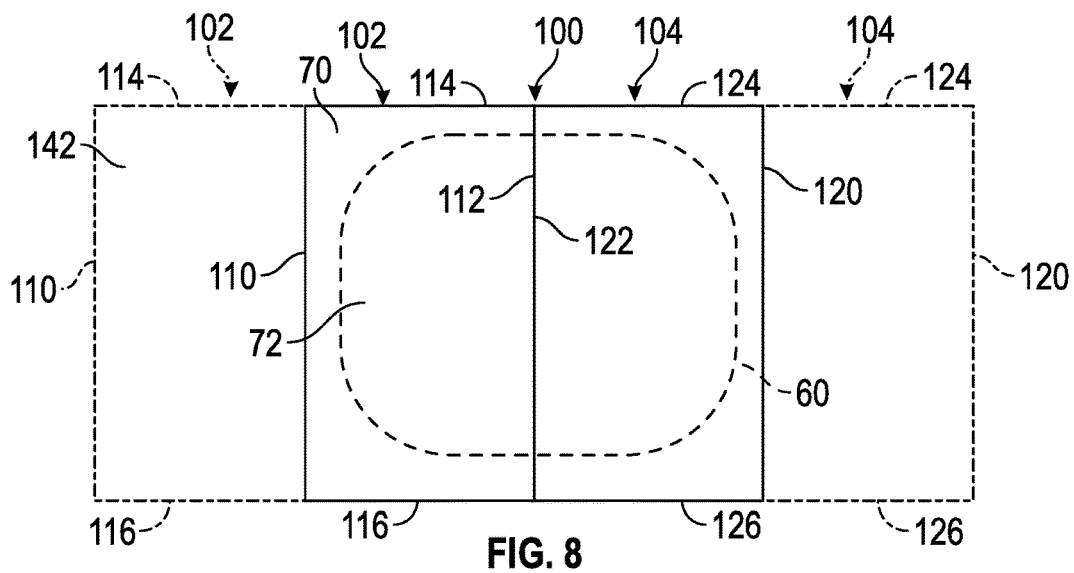
FIG. 8 is an elevation view of a display interface of a third embodiment of a steering wheel.
Figure 9:
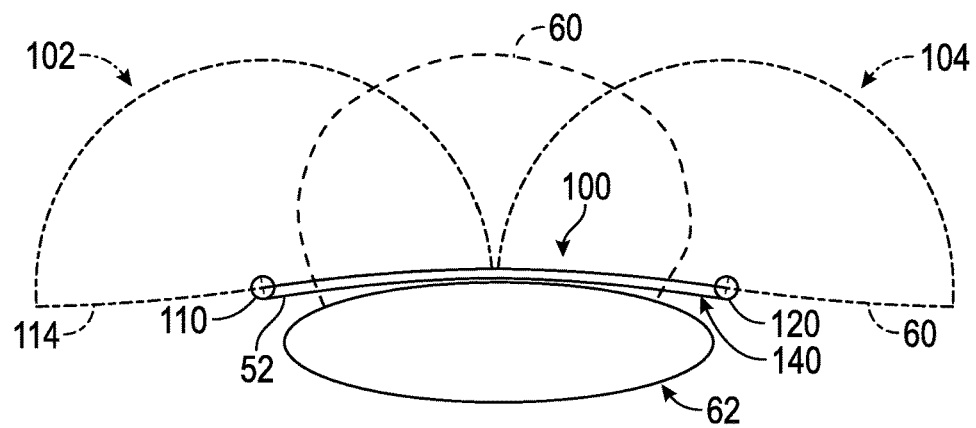
FIG. 9 is a top section view of the display interface of the third embodiment of the steering wheel during expansion of an airbag.

Referring to FIGS. 8 and 9, according to a third embodiment the display interface 100 of the steering wheel 30 may be slidably and/or hingedly connected to the steering wheel 30. A frame member 140 is disposed on the hub 50 or the airbag cover 52 of the steering wheel 30. The frame member 140 is configured to slidably and/or hingedly receive the first display segment 102 and the second display segment 104. The frame member 140 is sized such that it has a surface area larger than a surface area of the airbag cover 52.

The first display segment 102 and the second display segment 104 are movable relative to each other between a first position and a second position. The first position corresponds to a position in which the first display segment second side 112 abuts the second display segment second side 122 to provide the viewing area 72 having a first viewing size. Movement towards the second position corresponds to a position in which the first display segment second side 112 is laterally, longitudinally, or transversely spaced apart from the second display segment second side 122 to provide an expanded viewing area 142 having a second viewing size. The second viewing size being greater than the first viewing size.

Referring to FIG. 9, the first display segment 102 and the second display segment 104 are movable relative to each other via the frame member 140 while maintaining their respective hinged connections to at least one of the hub 50 and airbag cover 52 of the steering wheel 30. The maintenance of the hinged connections to at least one of the hub 50 and airbag cover 52 of the steering wheel 30 facilitates or enables the first display segment 102 and the second display segment 104 of the display interface 100 to hingedly move between the closed position in the open position in response to the at least partial inflation or expansion of the airbag 62 of the airbag module 60.

Figure 10:
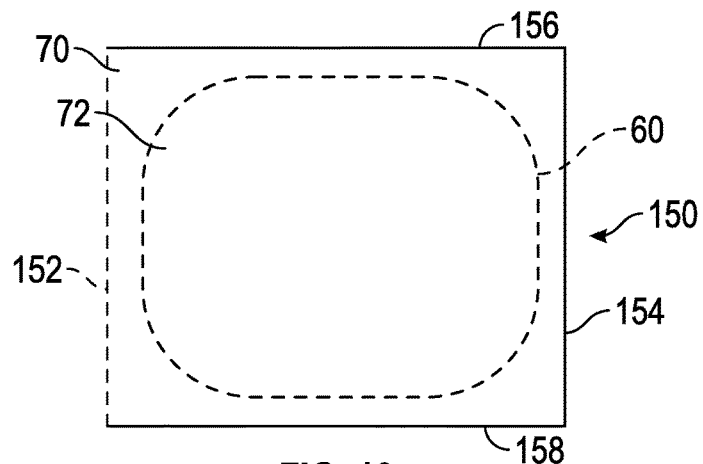
FIG. 10 is an elevation view of a display interface of a fourth embodiment of a steering wheel.
Figure 11:
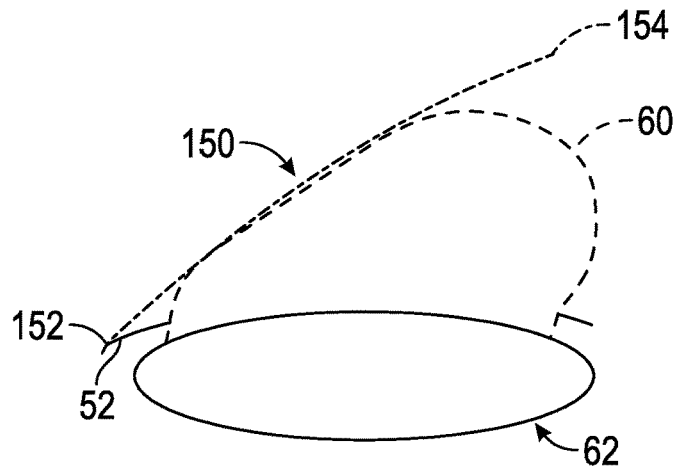
FIG. 11 is a top section view of the display interface of the fourth embodiment of the steering wheel during expansion of an airbag.

Referring to FIGS. 10 and 11, a fourth embodiment of a display interface 150 of the steering wheel 30 is shown. The display interface 150 is disposed on or within the steering wheel 30 over the airbag module 60. The display interface 150 is hingedly connected to at least one of the hub 50 and the airbag cover 52 of the steering wheel 30. The display interface 150 includes a first edge 152, a second edge 154, a third edge 156, and a fourth edge 158.

The first edge 152 is disposed opposite the second edge 154. The third edge 156 extends between a first end of each of the first edge 152 and the second edge 154. The fourth edge 158 is disposed opposite the third edge 156. The fourth edge 158 extends between a second end of each of the first edge 152 and the second edge 154.

One of the first edge 152 or the second edge 154 is hingedly connected to the hub 50 or the airbag cover 52 of the steering wheel 30. The opposite of the first edge 152 or the second edge 154 that is hingedly connected to the hub 50 or the airbag cover 52 is frangibly connected to the hub 50 or the airbag cover 52. Referring to FIG. 11, the display interface 150 is configured to hingedly swing about at least one of the first edge 152 and the second edge 154 to facilitate deployment or expansion of the airbag 62 of the airbag module 60 in response to the at least partial inflation or expansion of the airbag 62 of the airbag module 60. The frangilby connected edge, of the display interface 150 tears or detaches from one of the hub 50 or the airbag cover 52. The hinged or swinging motion of the display interface 150 operatively disconnects three sides of the display interface 150 from at least one of the hub 50 and the airbag cover 52 of the steering wheel 30.

Figure 12:
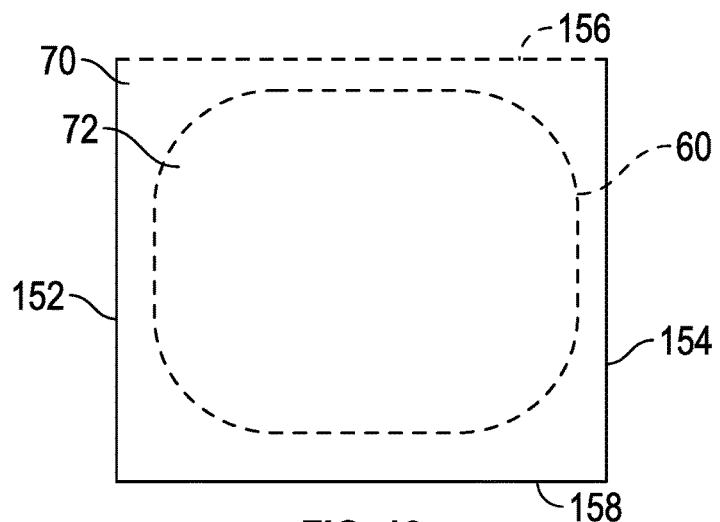
FIG. 12 is an elevation view of display interface of a fifth embodiment of a steering wheel.
Figure 13:
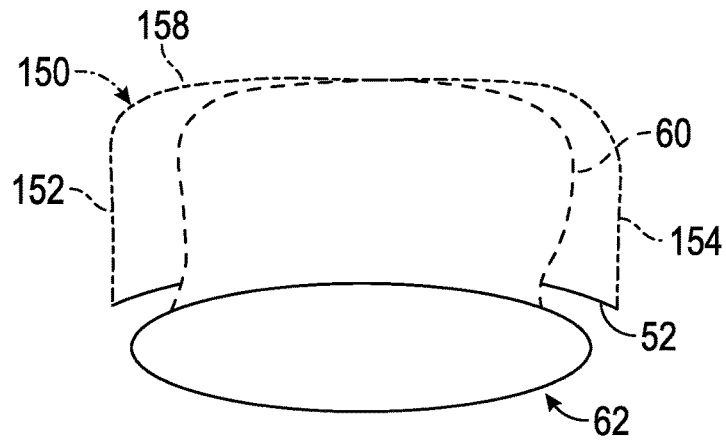
FIG. 13 is a top section view of the display interface of the fifth embodiment of the steering wheel during expansion of an airbag.

Referring to FIGS. 12 and 13, at least one of the third edge 156 and the fourth edge 158 are hingedly connected to the hub 50 or the airbag cover 52 of the steering wheel 30. The other of the at least one of the third edge 156 and the fourth edge 158 is frangibly connected to the hub 50 or the airbag cover 52. Referring to FIG. 13, the display interface 150 is configured to hingedly swing about at least one of the third edge 156 and the fourth edge 158 to facilitate deployment or expansion of the airbag 62 of the airbag module 60 in response to the at least partial inflation or expansion of the airbag 62 of the airbag module 60. The hinged swinging motion of the display interface 150 operatively disconnects three sides of the display interface 150 from at least one of the hub 50 and the airbag cover 52 of the steering wheel 30.

Throughout this specification, the term "attach," "attachment," "connected", "coupled," "coupling," "mount," or "mounting" shall be interpreted to mean that one structural component or element is in some manner connected to or contacts another element—either directly or indirectly through at least one intervening structural element—or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A steering assembly, comprising:
   a steering wheel selectively coupled to a steering shaft, the steering wheel having a hub that is configured to receive an airbag module and an airbag cover disposed on the hub; and
   a display interface disposed within the airbag cover over the airbag module, the display interface being configured to split along a predicted tear path that extends from a first side of the display interface towards a second side of the display interface in response to expansion of an airbag of the airbag module, wherein the display interface is configured as a frangible display interface.

2. The steering assembly of claim 1, wherein the display interface defines a display area having a viewing area completely disposed within the display area.

3. The steering assembly of claim 2, wherein the display interface defines a tear initiator that is aligned with the predicted tear path and extends from an edge of the display area towards the viewing area.

4. The steering assembly of claim 3, wherein the tear initiator is spaced apart from the viewing area.

5. The steering assembly of claim 4, wherein in response to expansion of the airbag of the airbag module the tear initiator facilitates formation of a split within the display interface that extends from the edge towards an opposite edge of the display area disposed opposite the edge.

6. A steering assembly provided with an autonomous vehicle, comprising:
   a steering wheel having an airbag module disposed within a hub of the steering wheel; and
   a display interface disposed on the steering wheel over the airbag module, the display interface having a first display segment disposed adjacent to a second display segment, the first display segment directly abuts the second display segment.

7. The steering assembly of claim 6, wherein the first display segment has a first display segment first side that is hingedly connected to the steering wheel and a first display segment second side that is disposed opposite the first display segment first side.

8. The steering assembly of claim 7, wherein the second display segment has a second display segment first side that is hingedly connected to the steering wheel and a second display segment second side that is disposed opposite the second display segment first side.

9. The steering assembly of claim 8, wherein the first display segment second side abuts the second display segment second side to define a split.

10. The steering assembly of claim 9, wherein in response to expansion of an airbag of the airbag module, at least one of the first display segment and the second display segment hingedly moves from a closed position towards an open position.

11. A steering assembly provided with an autonomous vehicle, comprising:
    a steering wheel having an airbag module disposed within a hub of the steering wheel;
    a display interface disposed on the steering wheel over the airbag module, the display interface having a first display segment disposed adjacent to a second display segment, the first display segment has a first display segment first side that is hingedly connected to the steering wheel and a first display segment second side that is disposed opposite the first display segment first side, the second display segment has a second display segment first side that is hingedly connected to the steering wheel and a second display segment second side that is disposed opposite the second display segment first side, the first display segment second side abuts the second display segment second side to define a split; and
    a frame member disposed on the steering wheel, the first display segment and the second display segment slidably attached to the frame member.

12. The steering assembly of claim 9 or 11, wherein the first display segment and the second display segment are movable between a first position in which the first display segment second side abuts the second display segment second side and a second position in which the first display segment second side is spaced apart from the second display segment second side.

13. The steering assembly of claim 12, wherein movement of the first display segment and the second display segment from the first position towards the second position provides an expanded viewing area of the display interface.

* * * * *